United States Patent
Volkov

(10) Patent No.: US 10,291,455 B2
(45) Date of Patent: May 14, 2019

(54) DOCSIS 3.1 STANDARD SIGNAL GENERATION

(71) Applicant: ARRIS Enterprises LLC, Suwanee, GA (US)

(72) Inventor: Oleksandr Volkov, Cork (IE)

(73) Assignee: ARRIS Enterprises LLC, Suwanee, GA (US)

( * ) Notice: Subject to any disclaimer, the term of this patent is extended or adjusted under 35 U.S.C. 154(b) by 153 days.

(21) Appl. No.: 15/374,482

(22) Filed: Dec. 9, 2016

(65) Prior Publication Data

US 2017/0180176 A1 Jun. 22, 2017

Related U.S. Application Data

(60) Provisional application No. 62/268,482, filed on Dec. 16, 2015.

(51) Int. Cl.
*H04L 27/26* (2006.01)
*H04L 5/00* (2006.01)
*H04B 3/03* (2006.01)

(52) U.S. Cl.
CPC ........ *H04L 27/2634* (2013.01); *H04L 5/0007* (2013.01); *H04B 3/03* (2013.01)

(58) Field of Classification Search
None
See application file for complete search history.

(56) References Cited

U.S. PATENT DOCUMENTS

| | | | |
|---|---|---|---|
| 6,313,885 B1 * | 11/2001 | Patel | H04L 27/0008 348/614 |
| 2006/0215540 A1 * | 9/2006 | Krishnamoorthi | H04L 27/2644 370/208 |
| 2016/0119662 A1 * | 4/2016 | Zinevich | H04N 21/2385 725/95 |
| 2017/0126441 A1 * | 5/2017 | Earnshaw | H04H 60/29 |
| 2018/0167230 A1 * | 6/2018 | Motozuka | H04J 11/00 |

OTHER PUBLICATIONS

Data-Over-Cable Service Interface Specification DOCSIS 3.1. Physical Layer Specification CM-SP-PHYv3.1—I02-140320. Cable Television Laboratories, Inc. 2013-2014.

* cited by examiner

*Primary Examiner* — Saumit Shah
(74) *Attorney, Agent, or Firm* — Lori Anne D. Swanson

(57) ABSTRACT

The generation of OFDM signals for DOCSIS 3.1 specification having a required number of subcarriers and subcarrier spacing can be based on a sampling rate that is modified from that defined by the DOCSIS 3.1 specification. In embodiments, the base sampling rate is defined as Fs=204.8*A MHz (A>1), with a respective increase of basic IFFT size by factor A. In embodiments, the OFDM signal is sampled at a sampling rate of 204.8 MHz*A for an IFFT size of 8192*A (4096*A), where A>1.

18 Claims, 6 Drawing Sheets

DOCSIS 3.1 STANDARD SIGNAL GENERATION

BACKGROUND

Operators of cable television systems, also known as Multiple Service Operators (MSOs), continuously make attempts to offer faster service to meet customer demand and competition for better service, yielding higher peak rates year after year. Data Over Cable Service Interface Specification (DOCSIS) is a cable communication standard developed to permit the addition of high-bandwidth data transfers to an existing cable television (CATV) system. It is employed internationally by many cable television operators to provide internet access over existing infrastructures, such as a hybrid fiber-coaxial (HFC) infrastructure, for example.

Upstream (US) resource allocation and scheduling in DOCSIS networks continue to have challenges that are different from those of downstream (DS) scheduling, where the traffic is broadcasted to all modems at once. Issues in the US direction that affect network migration include noise funneling, distortion, burst transmission, topology resolution, multiple access, etc.

To accommodate higher peak rates, the Data Over Cable Service Interface Specification (DOCSIS) 3.1 specifications were developed and issued in 2013. The DOCSIS 3.1 standard promises a great capacity potential by extending the spectrum in both the downstream (DS) and upstream (US) directions. DOCSIS 3.1 extends the spectrum by using, in part, a modern PHY technology (i.e., Orthogonal Frequency Division Multiplexing (OFDM)), and improved Forward Error Correction (FEC) technology (i.e., Low Density Parity Check Codes (LDPC)).

The migration to DOCSIS 3.1 may be challenging due to differences in technology from DOCSIS 3.0 to DOCSIS 3.1. For example, the migration in the US can be more challenging than the DS due to the limited available spectrum and the potential spectral overlap for DOCSIS 3.1 OFDMA channels and DOCSIS 3.0 Single-Carrier Quadrature Amplitude Modulation (SC-QAM) channels. Further, the DOCSIS 3.1 specification defines parameters that are not always efficient to implement. DOCSIS 3.1 requires the use of 192 MHz wide downstream OFDM signal, created by an inverse fast Fourier transform (IFFT) procedure and based on a clock frequency 204.8 MHz. In implementations, these parameters may conflict with design constraints of cable modem termination systems (CMTSs). In another example, the DOCSIS 3.1 standard defines a particular clock frequency which may conflict with clock frequencies that already exist or may be inconvenient to use in a current design. Since OFDM devices are not functioning in isolation, and may require a different clock frequency, a specific frequency could create problematic design changes. In some cases, limits on changing hardware prevents flexibility in changing a design, such as legacy hardware that cannot be modified.

Thus, techniques are desirable for implementing DOCSIS 3.1 in to the cable infrastructure in an efficient manner, including implementing the parameters introduced in DOCSIS 3.1.

DETAILED DESCRIPTION

The DOCSIS 3.1 standard specifies basing an OFDM system on a 204.8 MHz clock and a 4096/8192 IFFT size. Specifically, OFDM signals with a 192 MHz maximum bandwidth are produced by an inverse fast Fourier transform (IFFT) procedure with a sampling rate 204.8 of MHz, where an IFFT size of 8192 generates 7600 subcarriers, and an IFFT size of 4096 generates 3800 subcarriers. Table 1 below illustrates the DOCSIS IFFT parameters used with downstream OFDM signals.

However, the bandwidth/sampling rate ratio (192 MHz/ 204.8 MHz) leads to very resource consumptive interpolator (or low-pass filter), which should follow IFFT procedures to provide radio frequency (RF) signal generation. Thus, the use of a sampling rate of 204.8 MHz with downstream OFDM channels may require a complicated anti-alias filter after the IFFT. Further, a 204.8 MHz clock frequency is not always available in existing architectures. For example, the 204.8 MHz clock frequency may not be convenient for particular implementations because of various constraints in the design or current infrastructure.

TABLE 1

Downstream OFDM parameters

| Parameter | 4K mode | 8K mode |
| --- | --- | --- |
| Downstream Sampling Rate (Fs) | 204.8 MHz | 204.8 MHz |
| Channel bandwidth | 24 MHz . . . 192 MHz | 24 MHz . . . 192 MHz |
| IFFT size | 4096 | 8192 |
| Subcarrier spacing | 50 kHz | 25 kHz |
| Maximum number of active subcarriers (192 MHz channel) | 3800 | 7600 |

Disclosed herein are techniques for employing an OFDM system based on a modified sampling rate and IFFT size. As disclosed, the generation of OFDM signals complying with the DOCSIS 3.1 specification with a required number of subcarriers and subcarrier spacing could be done not only on the base of sampling rate 204.8 MHz, but on the base of any sample rate Fs=204.8*A MHz (A>1), with a respective increase of basic IFFT size by factor A.

In embodiments disclosed herein, the OFDM signal is sampled at a sampling rate of 204.8 MHz*A and an IFFT size of 8192*A (4096*A), where A>1. Thus, instead of using a 204.8 MHz sampling rate and an 8192/4096 IFFT size, the modifications disclosed herein may enable both significant resource savings for further interpolation procedures and flexible choices for a system clock. As described in more detail below, the disclosed techniques enable the use of less resources needed to implement an OFDM signal. While OFDM signals and systems are relevant to other technologies, by way of example, reference is made to DOCSIS systems. However, it should be understood that the techniques disclosed herein are not limited to DOCSIS technologies, but rather apply to OFDM signals in other technologies.

Figure 1:
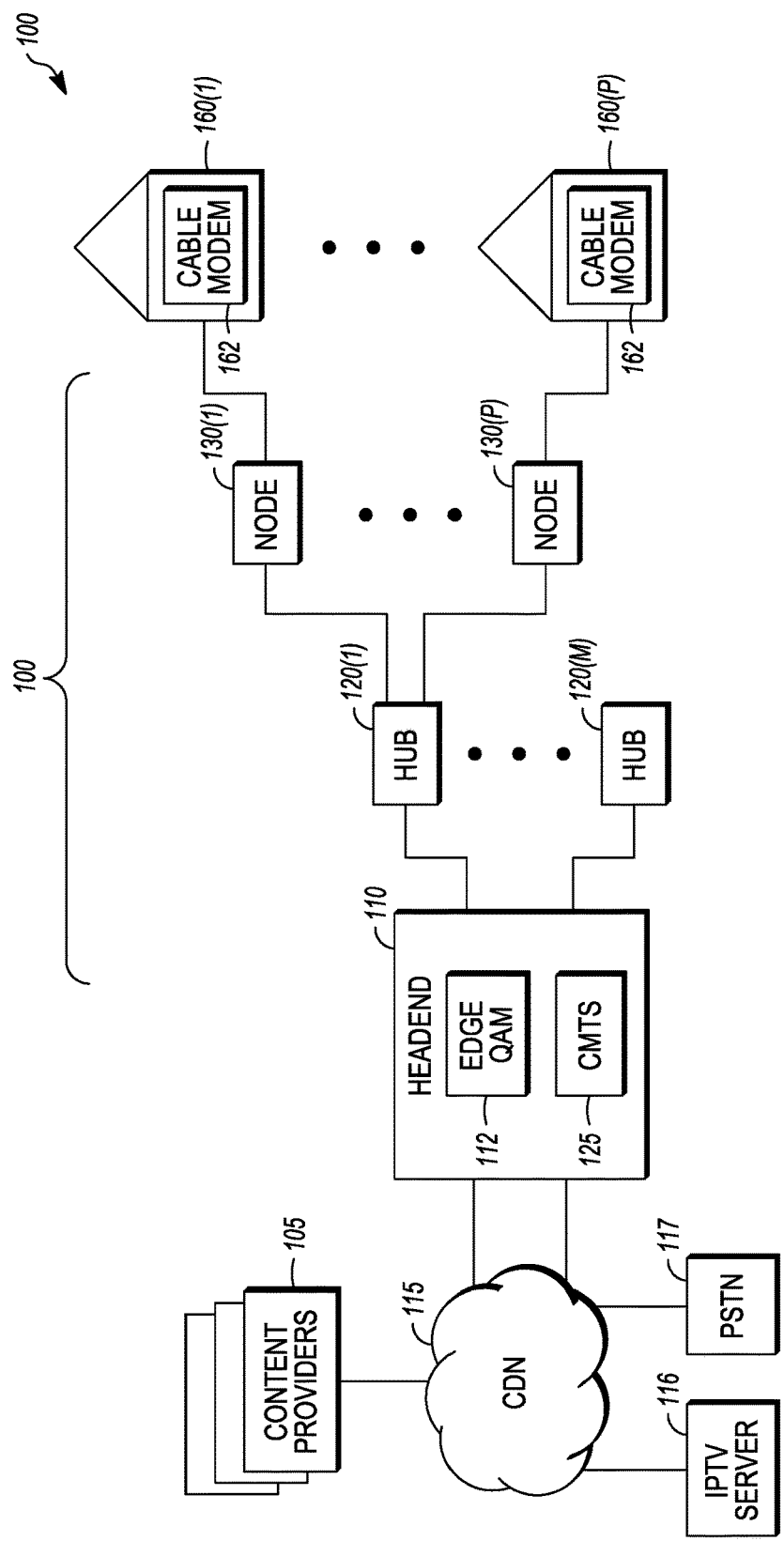
FIG. 1 illustrates an example cable television (CATV) system that may implement orthogonal frequency division multiple access (OFDMA) techniques.

FIG. 1 illustrates an example cable television (CATV) system 100 having a headend 110 that receives content over a content delivery network 115 and delivers content via a network to cable modems 162 or subscribers 160. Such cable television system may employ channels for delivering content, which may include DOCSIS channels including but not limited to any of the following: an orthogonal frequency division multiple access (OFDMA) channel, TDMA/ATDMA (time division multiple access/advanced time divisional multiple access) channels, and/or SCDMA (synchronous code division multiple access) channels.

For cable TV, the "last mile" to connecting the CATV system to the home is a bottleneck that can limit or prevent higher data rates. The last mile is made up of some combination of optical fiber and/or coaxial cables, electrical/optical converters, and amplifiers. The mix of optical fiber and coaxial cables is known as a hybrid fiber coax (HFC) network. CATV systems may employ Data Over Cable Service Interface Specification (DOCSIS) 3.1 in their existing cable TV network without requiring extensive changes to the HFC network infrastructure while maximizing both the downstream and the upstream data throughput.

As introduced in DOCSIS 3.1, orthogonal frequency division multiple access (OFDMA) is a manner of encoding digital data on multiple carrier frequencies, i.e., a plurality of subcarriers. The available bandwidth of an OFDMA channel may be divided into many narrow bands for transmitting data on these bands (subcarriers) in parallel, where the signals transmitted are mathematically orthogonal. Data is carried over the subcarriers by varying the phase or amplitude of each subcarrier (e.g., QPSK, 4-QAM, 16-QAM, 64-QAM, etc.).

An OFDMA channel is composed of many subcarriers, where each subcarrier may use a different modulation. In embodiments, the modulation level on each subcarrier results from varying the complex numbers at a Fourier transform input, e.g., an inverse fast Fourier transform (IFFT) input in the transmitter. The outputs of the IFFT include samples of a modulated signal.

OFDMA is a scheme that may be developed for wideband digital communication, whether wireless or over copper wires. OFDMA may be used in any data transmission, including applications such as digital television and audio broadcasting, Digital Subscriber Line (DSL) internet access, wireless networks, and 4G mobile communications. OFDMA is useful for many solutions, including, by way of example but not limited to: asymmetric digital subscriber loop (ADSL) and very high speed digital subscriber line (VDSL) broadband access via plain old telephone service (POTS) or public switched telephone network (PSTN) copper wiring, digital video broadcasting—cable (DVB-C), e.g., DVB-C2, power line communication (PLC), International Telecommunications Union (ITU) Telecommunications Standardization Sector (ITU-T) implementations, e.g., ITU-T G.hn high speed local area networking, Multimedia over Coax Alliance (MOCA), DOCSIS, and others.

The example cable television system 100 shown in FIG. 1 may implement OFDMA along with other DOCSIS channels that may overlap. The system 100 may be modified using the techniques disclosed herein for scheduling over such overlapping channels. The system 100 includes a headend facility (HEF) 110, a plurality of hubs 120(1)-120(m), and associated with each hub, a plurality of nodes 130(1)-130(n) and a plurality of customers 160(1)-160(p). Available signals in the cable TV network may be fed in at the headend of the cable network provider.

The HEF 110 or hubs 120 may have a cable modem termination system (CMTS) (shown as CMTS 125 in the HEF 110 by way of example in FIG. 1). The CMTS enables high-speed data services and provides coverage to several thousand end users, depending on the configuration. The CMTS may be connected to a plurality of nodes or to a plurality of hubs that extend to respective nodes. Each of the nodes 130 has one or more corresponding access points, and each of the customers 160 has one or more corresponding network elements 162, shown in FIG. 1 as a cable modem.

A single node 130 may be connected to hundreds of network elements 162. Described herein are techniques related to a cable modem network element 162; however it should be understood that the cable modem is used by way of example as the concepts apply to other network elements. Examples of network elements 162 include cable modems, set top boxes, televisions equipped with set top boxes, data over cable service interface specification (DOCSIS) terminal devices, media terminal adapters (MTA), and the like. Thus, where reference is made to a cable modem, the concepts also apply more broadly to alternate types of network elements 162.

A cable television system 100 provides one or more of commercial TV services, Internet data services, and voice services, e.g., Voice-over-Internet Protocol (VoIP) to one or more customer locations 160 (i.e., end users) in a given geographic area. To provide these services, the HEF 110 in the example cable television system 100 in FIG. 1 is shown coupled via a content delivery network 115 to a plurality of content providers 105, an IPTV server 116, and a public switched telephone network (PSTN) 117.

The content delivery network 115 may be a cable data network such as an all-coaxial or a hybrid-fiber/coax (HFC) network. Of course, other broadband access networks such as xDSL (e.g., ADSL, ADLS2, ADSL2+, VDSL, and VDSL2) and satellite systems may also be employed. In embodiments, the content delivery network 115 comprises, for example, a packet-switched network that is capable of delivering IP packets or data elements from an IPTV Server 116 to clients 160(1)-160(p), using, for example, a cable data network, PON, or the like. Examples of a content delivery network 115 include networks comprising, for example, managed origin and edge servers or edge cache/streaming servers.

The content delivery servers 115 deliver content via one or more wired and/or wireless telecommunication networks to users 160(1)-160(p). In an illustrative example, the content delivery network 115 comprises communication links 150 connecting each distribution node and/or content delivery server to one or more client devices, e.g., for exchanging data with and delivering content downstream to the connected client devices 160(1)-160(p). The communication links may include, for example, a transmission medium such as an optical fiber, a coaxial cable, or other suitable transmission media or wireless telecommunications.

By way of example, the cable television network in FIG. 1 may be a hybrid fiber-coaxial (HFC) cable network system 100; however, it should be understood the network may be all fiber, all coaxial, some combination of the two, or include the use of other communications mediums. A typical HFC network uses optical fiber for communications between the headend and the nodes and coaxial cable for communications between the nodes 130 and the end user network elements 160.

In a typical HFC networks, downstream (also referred to as forward path) optical communications over optical fiber transmission mediums are typically converted at the nodes 130 to RF communications for transmission over coaxial cable. Conversely, upstream (also referred to as return path) RF communications from the network elements are provided over the coaxial cables and are typically converted at the nodes to optical communications for transmission over the optical fiber. The return path optical link (the optical components in the HFC network, e.g. the transmission lasers, optical receivers, and optical fibers) contribute to the performance of the HFC network. In this HFC network example embodiment, the nodes 130 communicate via optical fibers with the hubs 120 and via coaxial cable to customer premises 160.

The HEF 110 and/or the hubs 120 may be coupled to the IPTV server 116 and PSTN 117 via CDN 115, e.g., the Internet, for providing Internet and telephony services (e.g., to and from customer 160(1)-160(p)) via the CMTS, a headend processor. The CMTS 125, in an embodiment, is a general-purpose computing device or application-specific integrated circuit (ASIC) that converts downstream digital data to a modulated RF signal, which is carried over the fiber and coaxial lines in the HFC network 150 to one or more customer locations 160. A communication interface may connect the CMTS 125 to the content delivery network 115 for routing traffic between the HFC network 150 and the internet network, the IP network 115, a PSTN, and/or the content providers 105. The various content providers, 105 for example, may be the source of media content (e.g., movies, television channels, etc.).

The CMTS forms an interface to N IP-based networks over the Internet. The CMTS modulates the data from the Internet (downstream modulator) for transmission to homes and receives the upstream data from homes (upstream demodulator). The CMTS additionally manages the load balancing, error correction parameters and the class of service (CoS). The CoS management makes it possible to assign higher priority to specific CMs.

It should be noted that there are multiple embodiments of a CMTS architecture, such as a CMTS with an integrated physical (PHY) layer, a CMTS with a distributed PHY, or a Converged Cable Access Platform (CCAP) architecture in which the QAM is placed in an edge QAM. In FIG. 1, the edge QAM 112 is shown in the headend, but the edge QAM 112 may be located downstream from the CMTS 125. The CMTS 125 may host downstream and upstream ports and may use separate F connectors for downstream and for upstream communication for flexibility. In embodiments, a communication interface utilizing downstream channels 1-4 connects the CMTS 125 to a portion of the HFC network 150 for communicating over the HFC network 150.

By way of example, embodiments below describe a cable modem network element 162 at the customer's premises 160 for receipt of the modulated signals from the HEF and/or CMTS. A cable modem is a type of network bridge having modem functionality for providing bi-directional data communication via radio frequency channels on a cable television network, such as a hybrid fiber-coaxial plant (HFC) or radio frequency over glass (RFoG) infrastructure. In an example implementation, a cable modem can be added to or integrated with a set-top box that provides a TV set with channels for Internet access. Cable modems may deliver broadband Internet access to the set-top box and/or TV in the form of cable Internet, taking advantage of the high bandwidth of an HFC or RFoG network. Cable modems can also deliver video services using Internet Protocol (IP). For example, the cable modem 162 may be connected to IPTV receivers or other items in a customer premises equipment (CPE). A customer PC or laptop as well as other associated devices such as tablets, smartphones or home routers are termed customer premises equipment (CPE).

The network element, e.g., cable modem, 162 is connected through the network 150 to the CMTS 125. The cable modem 162 converts signals received from the CMTS 125 carried over fiber and/or coaxial lines in the network. In the upstream the cable modems 162 may convert digital data to a modulated RF signal for upstream transmission and in the downstream the cable modems 162 may convert downstream RF signals to digital form. Thus, the conversion is done at a subscriber's facility.

In the downstream, the cable modem 162 demodulates the downstream RF signal and feeds the digital data to a CPE or an IPTV, for example. On the return path, in the upstream direction, digital data is fed to the cable modem (from an associated PC in the CPE, for example), which converts it to a modulated RF signal for upstream transmissions. Once the CMTS 125 receives the upstream RF signal, it demodulates it and transmits the digital data to its eventual destination. Cable modems 162 are therefore useful in transforming the cable system into a provider of video, voice and data telecommunications services to users.

DOCSIS is an international telecommunications standard that permits the addition of high speed data transfer to an existing cable television (CATV) network, such as cable television network 100. DOCSIS is employed by many cable television operators to provide Internet access over their existing network infrastructures, e.g., a hybrid fiber-coaxial (HFC) infrastructure, PON architectures, etc. Cable operators include multiple system operators (MSO)s, an operator of multiple cable or direct-broadcast satellite television systems. Any cable company that serves multiple communities is considered an MSO, though the term is often used to refer to companies that own a large number of cable systems, such as Rogers Communications, Shaw Communications, and Videotron in Canada; Cablevision, Charter Communications, Comcast, Cox Communications, and Time Warner Cable in the United States; or Virgin Media in the UK.

The cable television network 100 may be compliant with DOCSIS 3.1 as well as legacy (pre-3.1) DOCSIS protocols. The DOCSIS protocol is the protocol used to send digital video and data between a hub 120 or headend facility 110 and cable modem 162. DOCSIS is used to convey Internet or other packet-based networking information, as well as packetized digital video between CMTSs 125 and cable modems (CMs) 162. While embodiments are disclosed with reference to DOCSIS, the techniques for transmitting simultaneously on overlapping channels may apply to other networks or systems. For example, the disclosed techniques may apply to other systems that use OFDM-based profiles.

A typical DOCSIS architecture includes a cable modem (CM) 162 located at the customer premises 160, and a cable modem termination system (CMTS) 125 located at the CATV headend 110, as in the example cable television network 100 depicted in FIG. 1. In an embodiment, a memory in the headend 110, such a memory of the CMTS 125 or edge device 112, may include a DOCSIS program that implements the DOCSIS specification.

DOCSIS provides a variety of options available at Open Systems Interconnection (OSI) layers 1 and 2, the physical layer, and the data link layer. A DOCSIS physical layer may include the basic networking hardware transmission technologies of a network. A DOCSIS physical layer defines the means of transmitting raw bits rather than logical data elements over a physical link connecting network nodes. The bit stream may be grouped into code words or symbols and converted to a physical signal that is transmitted over a hardware transmission medium. The modulation schemes available for use and similar low-level parameters are defined by the DOCSIS scheme.

The evolving DOCSIS 3.1 platform employs orthogonal frequency division multiplexing (OFDM) and orthogonal frequency division multiple access (OFDMA) subcarriers for RF transmission, where the frequency-division multiplexing (FDM) scheme is used as a multi-carrier modulation method using multiple subcarrier signals that are orthogonal to each other. For example, a large number of closely space orthogonal subcarriers may be used to carry data on several parallel data streams or channels. Using orthogonal subcarriers minimizes or eliminates cross-talk between the sub-channels and inter-guard bands are not required i.e., the separate filter for each sub-channel is not required as it is in frequency division multiplexing (FDM).

OFDM is a complex modulation method that uses a number of narrowband subcarriers. All subcarriers are transmitted simultaneously, called the OFDM symbol. The OFDM symbols are broken up with a guard interval, known as the cyclic prefix. OFDM is used by most modern terrestrial transmission methods (mobile radio and terrestrial TV). The transmit signal is the sum of a number of digitally modulated carriers. Compared to the single carrier modulation, the subcarriers are transmitted with a relatively long symbol duration (FFT duration).

In OFDM, a single user transmits on all subcarriers at any given time. To support multiple users, time and/or frequency division access techniques may be employed. OFDMA, on the other hand, allows multiple users to transmit simultaneously on different sub-carriers per OFDM symbol.

Generally in DOCSIS 3.1, OFDMA is used in the upstream and OFDM is used in the downstream. For the DS, all OFDM subcarriers in a channel are generated in a single transmitter, which makes the generation of orthogonal subcarriers relatively simple. For the US, different CMs serving as transmitters each generate a subset of the subcarriers for an OFDM symbol. The subsets are not combined into a complete OFDM until they reach the receiver input at the CMTS. This is known as orthogonal frequency division multiple access (OFDMA). The individual CMs must be frequency synchronized, as the individual carriers would otherwise lose their orthogonality. The DOCSIS 3.1 specification limits carriers generated by a CM to a maximum frequency deviation of ±30 Hz.

In DOCSIS implementations, the OFDMA scheme may replace the DOCSIS physical layer or supplement the existing ATDMA with OFDMA. Thus, in DOCSIS 3.1 the physical layer (PHY) may change from previous versions of DOCSIS to be a new form based on OFDMA technology, both in upstream and downstream.

The multicarrier orthogonal frequency-division multiple access (OFDMA) channels can coexist anywhere in the downstream spectrum with legacy single-carrier quadrature amplitude modulation (QAM) channels. In evolving DOCSIS implementations, the subcarriers may be smaller than the previous 6 MHz and 8 MHz wide channel spacing, e.g., DOCSIS 3.1 may use 25 kHz to 50 kHz OFDM spacing between subcarriers. A single OFDM channel may be composed of many subcarriers of a fixed bandwidth.

In an example DOCSIS 3.1 implementation, the OFDM subcarriers are bonded inside a block spectrum that may be up to 192 MHz wide (96 MHz in existing U.S. systems) and each transmission channel may use up to 8192 (8K) orthogonal subcarriers, depending on the selected FFT mode. Being orthogonal means that all other subcarriers have a zero crossing at the peak of a given subcarrier. The high number of carriers makes it possible to investigate interference in the transmission channel selectively. As a result, subcarriers are either modulated differently or completely excluded from the data transmission, depending on the interference. The variously modulated single carriers make it possible to achieve a higher data throughput than with single-carrier modulation. DOCSIS 3.1 defines a sampling rate (fs), to correspond to the number of subcarriers and symbol duration, of 204.8 MHz for the downstream and 102.4 MHz for the upstream.

Figure 2:
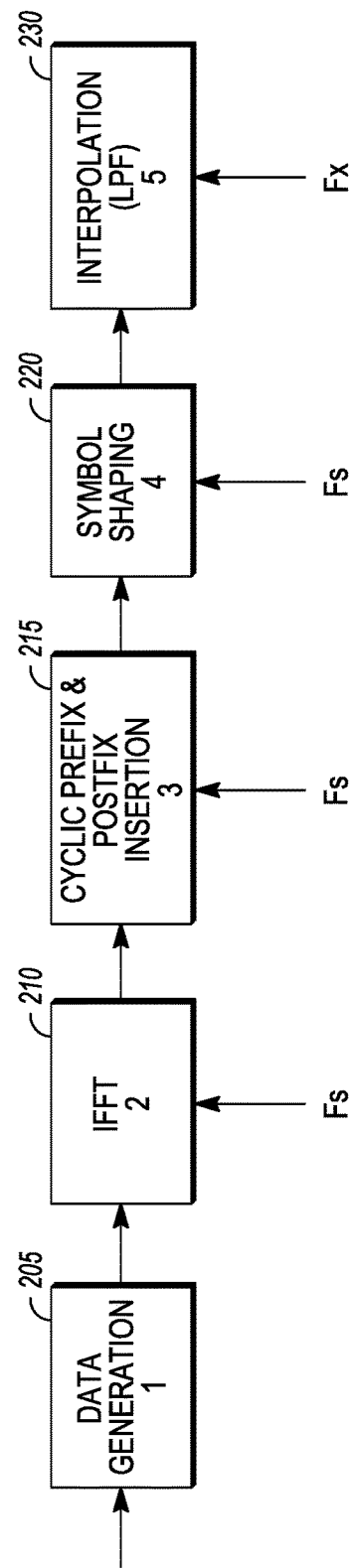
FIG. 2 depicts a block diagram of a DOCSIS 3.1 downstream signal generator (in baseband).

FIG. 2 depicts an implementation of a downstream OFDM generator. An input to the data generation processor/procedure 205 is downstream data that comes from a previous headend processing block. The data generation processor/procedure 205 may combine all algorithms, such as the combination of algorithms required by DOCSIS 3.1 standard data generation procedures.

Digital signal processing means that it is not necessary to have a modulator at the transmitter end or a demodulator and a channel filter at the receiver end for each single carrier. Instead, the subcarriers are orthogonally generated in the transmitter by means of an inverse fast Fourier transform (IFFT) and received by the receiver without filtering by means of a fast Fourier transform (FFT). The IFFT procedure or processor 210 implements an IFFT procedures with the parameters of Table 1.

IFFT generates an OFDM signal on the base of data that comes from the data generation block 205. The IFFT algorithm:

$$Y(k) = \sum_{n=0}^{N-1} x(n) \cdot e^{j\frac{2\pi nk}{N}},$$

where k=0, . . . , N−1, and, in case of Cooley-Tukey, could be expressed as $$Y(N_2 k_1 + k_2) = \sum_{n_1=0}^{N_1-1} e^{j\frac{2\pi \cdot n_1 k_1}{N_1}} \left[ e^{j\frac{2\pi \cdot n_1 k_1}{N_1}} \sum_{n_2=0}^{N_2-1} e^{j\frac{2\pi \cdot n_2 k_2}{N_2}} x(n_1 + N_1 n_2) \right],$$

where $N = N_1 \cdot N_2$;
$n = n_1 + N_1 \cdot n_2$;  $n_1 = 0, 1, \ldots, N_1 - 1$;  $n_2 = 0, 1, \ldots, N_2 - 1$;
$k = k_2 + N_2 \cdot k_1$;  $k_1 = 0, 1, \ldots, N_1 - 1$;  $k_2 = 0, 1, \ldots, N_2 - 1$.

As described in more detail below, multipliers are basic components of the IFFT procedure. The multipliers are used to multiply input data and intermediate data by sin(P) or cos(P), where P represent phase values and may be determined from the IFFT algorithm. The IFFT algorithm's efficiency may be measured by the number of required multiplications and additions. For example, a complexity of a hardware/firmware design or implementation of the algorithm may be determined by the number of multiplications/second, since multipliers typically take up real estate and clock-cycles on processors. Thus, less multipliers may lead to a less complex implementation of the IFFT procedure, which may also mean less system power consumption since multipliers tend to consume a high amount of power.

It is noted that the cyclic prefix (CP) and postfix insertion processor/procedure 215, the symbol shaping procedure or processor 220, and the interpolation (LPF) processor/procedure 230 may be included in the OFDM signal generation. In embodiments, the output of the LPF processor/procedure 230 is input to a digital frequency up-converter and then to a digital to analog converter (DAC). The analog signal output may be delivered via coaxial cable.

In embodiments that include the cyclic prefix (CP) insertion at 215, a protective interval between OFDM symbols is inserted in this block 215. The mutual influence from sequentially transmitted OFDM symbols is known as inter-symbol interference (ISI). As a result of this ISI, the OFDM symbols coming into the receiver can also be faulty. ISI originates from reflections that cause an additional signal component to come into the receiver after a delay of several ns to a few μs. To counteract this problem, a protective interval may be inserted into the transition between two sequential symbols. In the DOCSIS 3.1 standard, this interval is known as the cyclic prefix (CP), as performed by the cyclic prefix and postfix insertion processor/procedure 215. In other transmission methods using OFDM, it is typically known as the guard interval (GI).

Symbol shaping at the processor/procedure 220 integrates a roll-off period into the CP. DOCSIS 3.1 defines windowing for signal filtering in order to minimize the influence on adjacent channels. A Tukey raised cosine window is used for this purpose. The steepness of the filter is defined by the roll-off period. The roll-off period is integrated into the CP and must be smaller than the CP.

The interpolation processor/procedure 230 is doing interpolation to higher sampling rate Fx. The interpolation is defined in the DOCSIS 3.1 standard to produce a downstream signal on the center frequency from 258 to 1218 MHz, which implies using up-sampling with interpolation and some kind of frequency up-conversion after that. IFFT at 210 does baseband generation, so its sampling rate is relatively low (208.4 MHz). Downstream output may require a much higher sampling rate Fx (at least 2.5 GHz). To achieve the higher sampling rate, the sampling rate of IFFT output may be increased to Fx by the Interpolation processor/procedure 230.

Interpolation is referenced as an example method for increasing the sampling rate. The simplest way of increasing the sampling rate via interpolation is an up-sampling by zeroes followed by a Low-Pass Filter (LPF). For example, if Fx=M*Fs, where M is whole number, each IFFT output sample may be accompanied by M−1 zeroes during up-sampling. M may be determined as Fx/Fs, where Fx is the output sampling rate. As described above, Fx may be determined by top level system architecture and cannot be changed. Thus, in an example scenario, if Fs is defined by the standard, such as 204.8 MHz required by DOCSIS 3.1, and Fx is defined by a CMTS design, e.g., Fx=4608 MHz, then in this example M=Fx/Fs=22.5 which is not convenient because M is not a whole number. However, using the disclosed techniques, M may be determined as a whole number value based on an adjustment to Fs.

Figure 3:
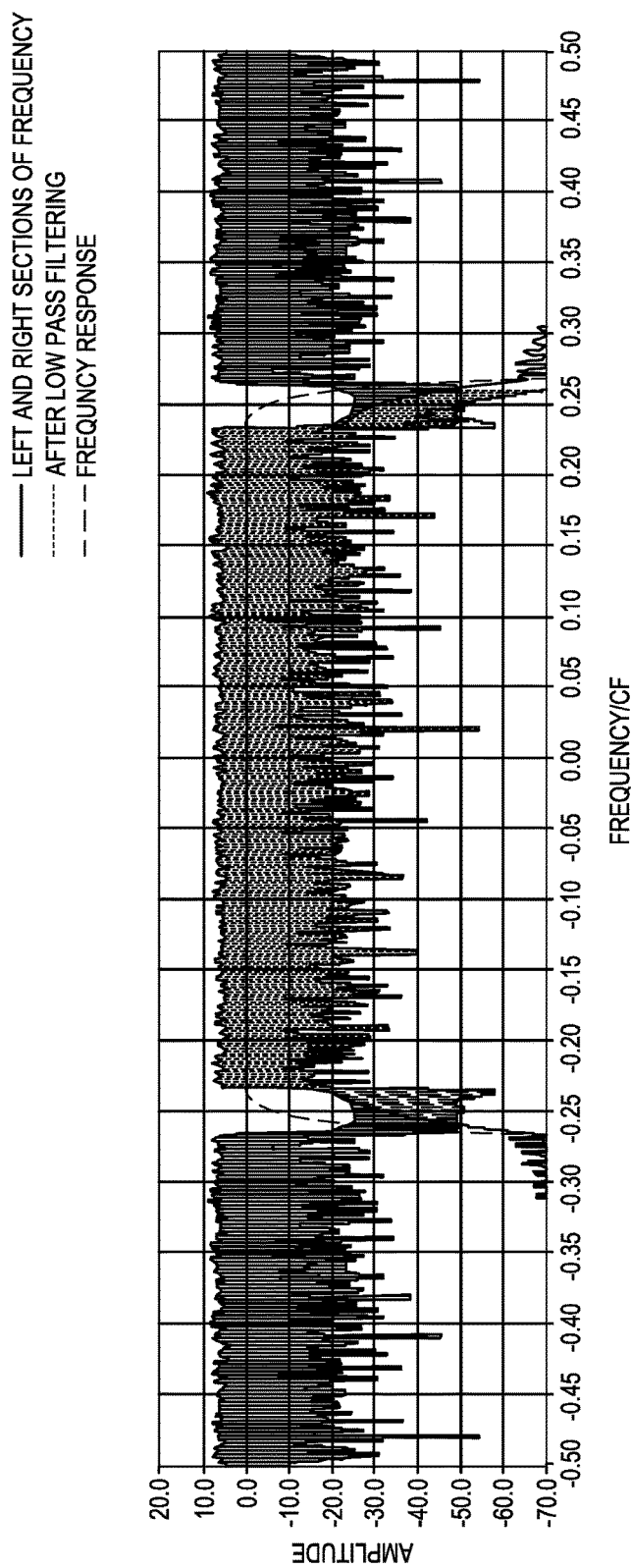
FIG. 3 depicts an example spectrum of an OFDM signal with a 204.8 MHz clock and 8912 points IFFT.

FIG. 3 shows a typical OFDM spectrum (192 MHz, 7600 subcarriers) after 8192 points IFFT plus up-sampling by 2. As used herein, the IFFT points refer to the number of samples output from the IFFT procedure, such that points and samples are inter-related terms used herein. It should be understood that the word "points" is associated with the IFFT procedure to reflect mathematical terminology, where samples is signal processing terminology. For example, an IFFT output samples are a result of an X-points IFFT procedure. Shown are the left and right sections of frequency, and then the section of the spectrum after low pass filtering (LPF) (the middle frequency section). Such LPF will provide an output sampling rate 409.6 MHz. If the required sampling rate Fx is higher, further up-sampling and filtering may be desired or required.

To explain the complexity of the LPF that is used in the case of a 204.8 MHz clock, an example of image suppression of 68 dB is contemplated. To achieve the image suppression of about 68 dB in this example, a 121 taps LPF was used. The amount of image suppression of 68 dB is used as an example and it should be understood that different amounts of suppression may be desirable, and the amount should have some margin because of analog noise of the circuitry after the DAC. The suppression is shown in FIG. 3 as a suppression of the left and right alias spectrums, which may be done to provide certain adjacent noise levels defined by the DOCSIS 3.1 standard and depending on a total bandwidth of the downstream, noting that the downstream may include one or more OFDM blocks and single carrier signals. The amount of image suppression may be implementation-specific, such as defined based on the design of a CMTS, for example. Similarly, the number of LPF taps may depend on the LPF design approach and could vary. But, the example is provided to illustrate that, for the spectrum shown in FIG. 4, the LPF size can be significantly smaller than for the spectrum shown in FIG. 3.

A tap is a coefficient/delay pair. The number of taps, (often designated as "N") is an indication of 1) the amount of memory required to implement the filter, 2) the number of calculations required, and 3) the amount of "filtering" the filter can do; in effect, more taps means more stopband attenuation, less ripple, narrower filters, etc. Such LPF requires at least 60 multipliers to result in the symmetrical spectrum structure, and so that each second point of impulse response is 0. As described in more detail below, each IFFT size requires a different number of multipliers, where an LPF with more multipliers is more complex than one with less multipliers.

The LPF frequency response is shown on FIG. 3 (the line that overlaps somewhat with the middle frequency section). Implementations of such an LPF consumes more multiplication resources than IFFT itself. As an example: 24 multipliers for a Cooley-Tukey base 4 algorithm is a complex multiplication based on four real multiplications). Additionally, a 204.8 MHz clock frequency may not be convenient for this particular LPF implementation because of various constraints which present in any design, such as the Fx/Fs ratio described herein. Downstream sampling rate 204.8 MHz and IFFT size 8192/4096 are included in DOCSIS 3.1 standard (Table 1), but it could be proved, that they are not compulsory. The main requirements of DOCSIS 3.1 standard are subcarrier spacing and number of subcarriers. It does not matter with the help of which sampling frequency and initial IFFT size they were produced, because a receiving device (modem) will receive an RF signal with 7600 subcarriers and 25 kHz subcarrier spacing (or 3800 subcarriers, 50 kHz spacing) without it mattering for the modem what IFFT size and sampling rate were used during signal creation. Subcarrier spacing S could be expressed as S=Fs/N, where N is IFFT size and Fs is sampling rate. So the same S could be achieved by various Fs and N. Using of IFFT size N higher than in standard in conjunction with 7600 (or 3800) used carriers (as in standard) will provide bigger distance between spectrum images on FIG. 2 and respectively easier interpolation procedure (LPF).

Disclosed herein are embodiments for reducing resource usage and improving DOCSIS 3.1 downstream signal generator flexibility by using a different IFFT sampling frequency Fs from the DOCSIS 3.1 standard. In embodiments, instead of using the DOCSIS 3.1 standard-defined 204.8 MHz sampling rate and 8192/4096 IFFT size, disclosed is use of a sampling rate 204.8 MHz*A and IFFT size 8192*A (or 4096*A), where A>1. Such modified sampling rate provides significant resource saving for further interpolation procedure and a more flexible choice of system clock.

Table 2 depicts three example results of using the disclosed clock frequency 204.8*A MHz in conjunction with IFFT size 4096*A (or 8192*A), the first set of results using the DOCSIS 3.1 standard clock frequency of 204.8 MHz where A=1. The remaining results provide examples of OFDM signals generation on the base of a sample rate Fs=204.8*A MHz (A>1), with a respective increase of basic IFFT size by factor A.

Table 2 below shows the multipliers number for four different realizations of OFDM generator, each with Nc=7680 subcarriers, 25 kHz subcarrier spacing, where each realization is based on a different sampling rate. In an LPF, filtering an IFFT size requires the LPF to have a certain number of multipliers. As the IFFT size increases, so does the number of multipliers in the IFFT process as well as the number of multipliers in the LPF process.

Using the disclosed techniques, however, the IFFT size can be increased while reducing a total number of multipliers used to generate the OFDM signal. As the IFFT size increases, the number of multipliers for filtering the signal in the LPF may be reduced. Thus, as the IFFT size increases, the number of multipliers in the LPF may in fact be reduced in total number as the IFFT size increases. Further, as the rate at which the IFFT size increases, the rate at which the number of multipliers increases for the IFFT process may be slower than the rate of increase in the IFFT size. In other words, the number of multipliers in the LPF may decrease more than the number of IFFT multipliers increase. Thus, the total number of multipliers used to generate the OFDM signal decreases as the IFFT size increases.

Figure 4:
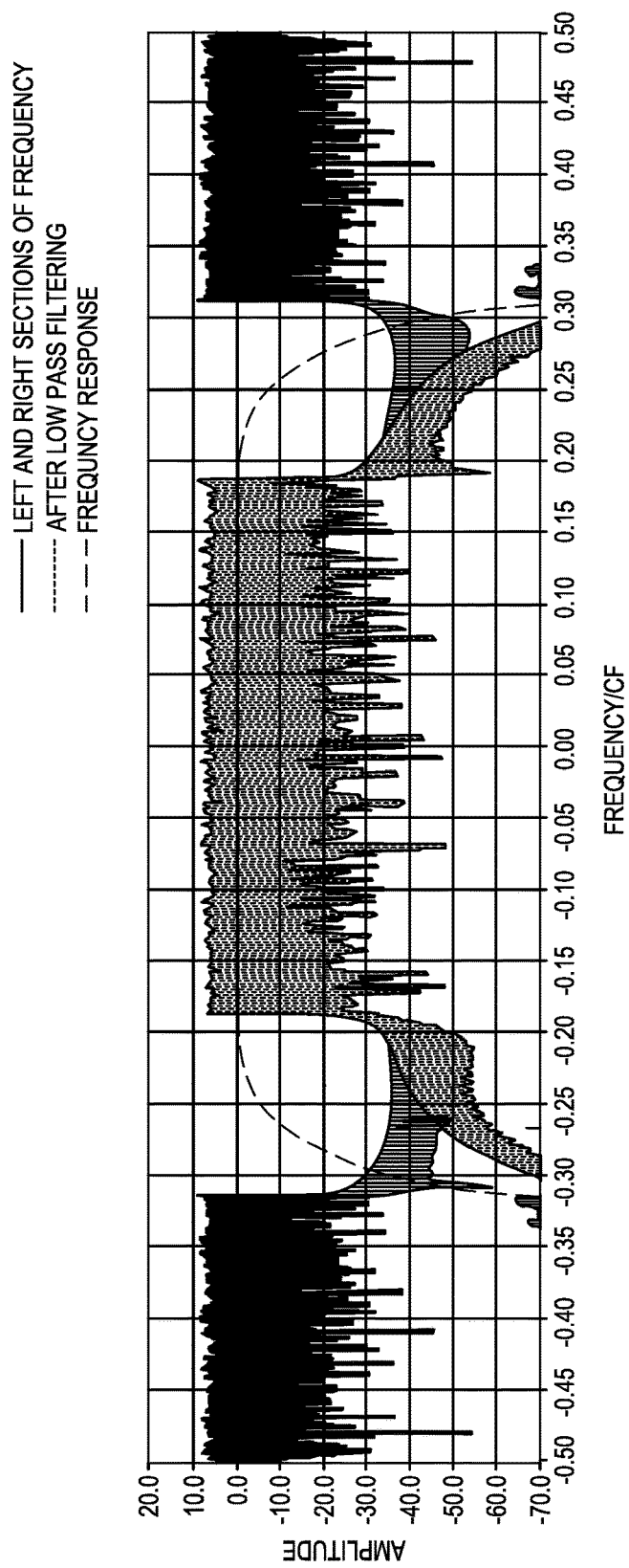
FIG. 4 depicts an example spectrum of an OFDM signal with 288 MHz clock and 11520 points IFFT.

The sampling rate, Fs, is a frequency of a clock or oscillator that is used as source of timing in the OFDM generator system shown in FIG. 2. For example, Fs may be used for timing in each of the processes/procedures shown in FIG. 2. The oscillator or clock may be connected to the OFDM generator system or may be an internal clock. If a clock with a predetermined sampling frequency exists, than the IFFT size can be defined. If the sampling rate is not defined or restricted by the clock, then the clock rate may be defined based on the IFFT size. Often the IFFT size is determined based on an IFFT algorithm employed by the IFFT process/procedure 210, and a clock may be selected that is suitable for that IFFT size. However, where a clock is defined with a certain sampling rate, a new IFFT size may be selected and then a respective IFFT algorithm may be used to determine how many multipliers for the IFFT procedure and/or LPF filtering are needed. For example, when IFFT size is defined, the plots in FIG. 3 and FIG. 4 illustrate how precise the LPF should be, where a bigger IFFT size leads to a lower number of LPF multipliers. Or, an available sampling rate available for a clock may be used without the necessity of generating the rate 204.8 MHz specifically. For example, if an output downstream sampling rate is Fx=2304 MHz, the IFFT sampling rate Fs=288 MHz could be selected, and then up-sampled by 8. If the clock frequency of 204.8 MHz were used instead, the up-sampling required would be by a factor of 11.25. For each example in Table 2 with a different A value, the LPF provides about 68 dB image suppression. The number of multipliers for IFFT for each A value is calculated on the base of a Cooley-Tukey algorithm, i.e., each "*" sign in N (IFFT size) factorization requires one complex multiplication (4 real multipliers), each number 4 or 2 does not require multipliers (because 2 and 4 points IFFTs are trivial), each number 3, 5, 6 requires 2 real multipliers. Thus, as an example of a determination of the "Multipliers Total" in the first column for a 204.8 MHz sampling rate (Fs), is determined as 24+60, where 60 is the number of multipliers in LPF and 24 is the number of multipliers used in the IFFT procedure. The 24 multipliers used in the IFFT procedure is determined from the IFFT size factorization: 8192=4*4*4*4*4*2.

| Sampling Rate (Fs) | 204.8 MHz | 256 MHz | 288 MHz | 384 MHz |
|---|---|---|---|---|
| IFFT size (N) | 8192 | 10240 | 11520 | 15360 |
| Nnumber of carriers (Nc) | 7680 | 7680 | 7680 | 7680 |
| Carrier Spacing (kHz) | 25 | 25 | 25 | 25 |
| IFFT factorisation | 4*4*4*4*4*2 | 4*4*4*4*4*2*5 | 4*4*4*6*6*5 | 4*4*4*4*4*3*5 |
| Number of multipliers in IFFT | 24 | 26 | 26 | 28 |
| LPF complexity factor B/Fs | 0.9375 | 0.75 | 0.67 | 0.5 |
| Number of multipliers in LPF | 60 | 19 | 17 | 11 |
| Multipliers Total | 84 | 45 | 42 | 39 |

For example, the second column in Table 2 defines the IFFT size when using a sampling rate of the DOCSIS 3.1 standard size is N=8192. In accordance with the disclosed techniques, increasing the IFFT size based on a sampling rate of Fs=256 MHz, where 2.56 MHz is 1.25× the standard 204.8 MHz clock frequency, then using A=1.25 (256=204.8*1.25), then the IFFT size is 8192*A, or 10240, as shown in the third column of Table 2 below. As shown, as the IFFT size increases, A is not necessarily an integer value.

In embodiments, it may be assumed that respective small size IFFTs are done on the base of most efficient implementation. As explained above, the Cooley-Tukey IFFT algorithm was used as the base for calculating the number of multipliers, which is an algorithm based on a large IFFT realized as, e.g. divided in to, several small IFFTs (the sizes of the small IFFTs illustrated in 5th line of the table for various embodiments). In another example in Table 2, as shown for a sampling rate of 288 MHz there are 5 multiplier signs resulting in the use of 5 complex multipliers (20 real) and three small IFFTs: 6, 6, and 5, each requiring 2 real multipliers, therefore a total of 26 multipliers. In contrast, the IFFT with size 4 does not require multipliers. If an efficient implementation were to use a different algorithm, for example Winograd or Rader, the small sizes like 5, 6 may not be used because the number of multipliers would increase.

As illustrated by Table 2, the disclosed modifications to the sampling rate and IFFT size enables selection, by a designer for example, of the most convenient sampling rate from the point of view of product design. For example, the disclosed techniques enable the use of available clock frequencies without requiring a generation of the standard-specific 204.8 Mhz and the required further signal resampling to achieve the desired rate. Rather, if an output downstream sampling rate is desired, e.g., Fx=2304 MHz, an appropriate IFFT sampling rate could be chosen, in this example an IFFT sampling rate Fs=288 MHz would be chosen. Further, in this example, an up-sampling by 8 process would be much easier than up-sampling by 11.25 (which would be required using the standard-specific 204.8 MHz).

FIG. 4 shows the same OFDM spectrum of 7680 carriers as shown in FIG. 3, but produced by 11520 points IFFT and clock frequency (CF) 288 MHz (see Table 2, third column) with a sampling frequency after the LPF as 288*2 MHz, in contrast to the CF of 204.8 MHz for FIG. 3 and a sampling frequency after LPF of 204.8*2 MHz. The horizontal scale is the relative frequency.

To achieve a similar image suppression as shown in FIG. 3, only 35 taps LPF is necessary (17 multipliers) in the example illustrated in FIG. 4 (the LPF output is shown by the line in FIG. 4 that extends beyond the middle frequency section). Concurrent with the results in Table 2, FIG. 4 exemplifies that increasing sampling rate and IFFT size may provide a significant reduction of LPF complexity factor, while the IFFT complexity (number of multipliers) is rising relatively slow. Thus, because the number of multipliers in LPF is very dependent on the specifics of the implementation, FIG. 3 and FIG. 4 illustrate that the LPF is much simpler in FIG. 4 compared to that of FIG. 3. To clarify, the complexity of the LPF may be characterized by its sharpness, where FIG. 3 illustrates a much sharper filter because the frequency response goes from a maximum to 0 much more quickly than the filter response shown in FIG. 4. And it is clear from Table 2 that increasing a sampling Rate and IFFT size provides a significant reduction of LPF complexity factor while IFFT complexity (number of multipliers) is rising relatively slow. So designer can choose desired pair of clock frequency and IFFT size.

The LPF complexity factor is a characteristic of filter complexity for any implementation. The number of LPF multipliers is calculated using an assumption of a half band filter with 68 dB first image suppression. However, it should be understood that such specifics are used for purposes of example, and that the filter characteristics could vary dependently from filter implementation. In general, LPF complexity could be expressed by a factor C=B/Fs, where B is signal bandwidth. When C is going closer to 1 filter implementation becomes extremely difficult. Filters with C<0.7 are relatively simple. As an example, the DOCSIS 3.1 standard defines B as 192 MHz. For the Fs=204.8 MHz implementation defined by the DOCSIS 3.1 standard, disclosed herein are techniques for adjusting parameters to use an Fs of 266 MHz, 288 MHz, or 384 MHz, by way of examples. As illustrated herein, for Fs=204.8 MHz, C=192 MHz/204.8 MHz=0.9375 which corresponds to a complicated LPF implementation, whereas for Fs=288 MHz, C=192 MHz/288 MHz=0.67, which corresponds to a relatively simple LPF. Thus, C is an expression of the LPF's sharpness, where the sharper LPF may be a more complex implementation.

As shown by Table 2, the use of a clock frequency 204.8*A MHz in conjunction with IFFT size 4096*A (or 8192*A) provides a reduction of resource usage. Thus, not only is a reduction of resources usage made possible, but the disclosed techniques improve DOCSIS 3.1 downstream signal generator flexibility by using an IFFT sampling frequency Fs that is different from the DOCSIS 3.1 standard.

Figure 5:
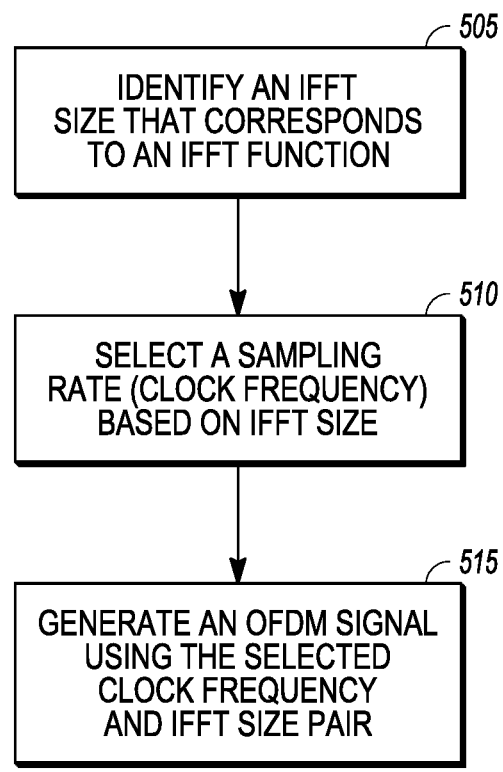
FIG. 5 is a flow diagram illustrating an embodiment for generating an OFDM signal in accordance with the disclosed techniques.

As described herein, the disclosed techniques may enable a designer to choose the most or a more convenient sampling rate from the point of view of product design. As described above, the disclosed technique enable the use of clock frequencies in an existing design without requiring a new clock or new configuration to meet the standard-specific 204.8 MHz and further signal resampling to desired rate. FIG. 5 is a flow diagram illustrating an embodiment for generating an OFDM signal in accordance with the disclosed techniques. FIG. 5 illustrates the selection of a clock frequency and inverse fast Fourier transform (IFFT) size pair for generating the one or more OFDM signals. To identify the clock frequency and IFFT size pair, a baseline IFFT size associated with a first sampling rate may be identified and a second IFFT size or a second sampling rate is selected. For a selected second IFFT size, a clock frequency may be determined that pairs with the second IFFT size by modifying the first sampling rate by a factor of A, where A is the factor by which the selected second IFFT size differs from the baseline IFFT size. For a selected second sampling rate, the second sampling rate for clock frequency paired with the baseline IFFT size may be modified by a factor of A, where A is the factor by which the selected second sampling rate differs from the first sampling rate As shown in FIG. 5 at 505, an IFFT size is identified that corresponds to an IFFT function. The basic frequency of a design is the frequency Fx described above, which is the DAC output sampling rate. As disclosed herein, frequency Fs may be defined as Fx/M, where M is a whole number. In embodiments, the preferred value of M==2^N for easiest filtering. Usually the frequency Fs has many constraints, like which FPGA or clock oscillators are available and compatible. In general, the Fs is defined as 204.8*A, and then the IFFT size can be determined. For example, to align with DOCSIS 3.1, the IFFT sizes would include both DOCSIS 3.1 sizes, 4096 and 8192, therefore calculating for both, e.g., 4096*A and 8192*A.

As shown in FIG. 5 at 510, a sampling rate, or clock frequency, may be selected based on the IFFT size. In embodiments, the sampling rate Fs is selected based on the calculation Fs=204.8*A MHz (A>1), where A is the ratio of IFFT size based on the IFFT size relevant for a 204.8 MHz clock frequency. For example, where A may determine the clock frequency, A may be equal to (identified IFFT size)/4096 or (identified IFFT size)/8192.

At 515, an OFDM signal is generated using the identified clock frequency and IFFT size pair in an IFFT function.

Figure 6:
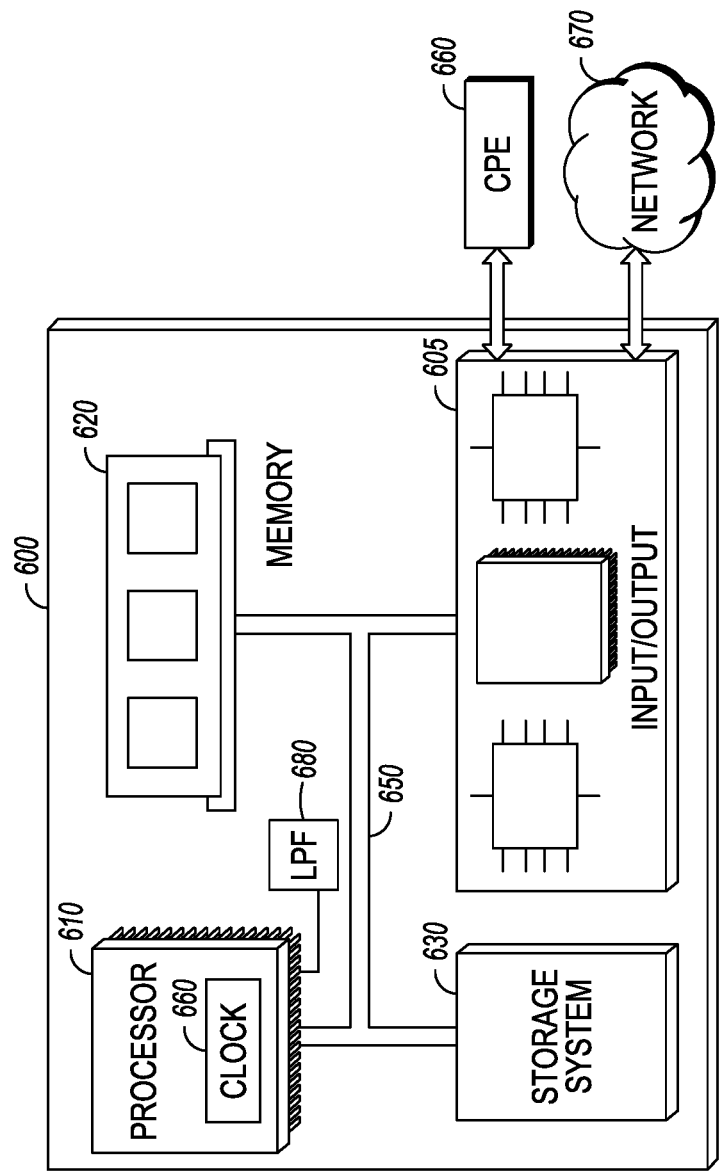
FIG. 6 is a block diagram of a hardware configuration operable to perform the functions disclosed herein.

FIG. 6 is a block diagram of a hardware configuration 600 operable to perform a portion of or some of the concepts described herein, such as the functionality depicted in FIG. 5. It should be understood that the hardware configuration 600 can exist in various types of devices. In embodiments, the hardware represents hardware included in a network element as disclosed herein for generating one or more OFDM signals in an OFDM transmission system.

The hardware configuration 600 can include a processor 610, a memory 620, a storage device 630, an input/output device 640, a clock 660, and a low pass filter 680. Each of the components 610, 620, 630, 640 660, and 680 can, for example, be interconnected using a system bus 650. The processor 610 can be capable of processing instructions for execution within the hardware configuration 600. For example, as disclosed herein, one or more processors may be used to generate the one or more OFDM signals, which may include identifying a clock 660 frequency and IFFT size pair. The one or more processors may be used to identify a baseline IFFT size associated with a first sampling rate, and select either a second IFFT size or a second sampling rate. For a selected second IFFT size, the one or more processors may use the second sampling rate for clock frequency paired with the baseline IFFT size modified by a factor of A, where A is the factor by which the selected second sampling rate differs from the first sampling rate. As disclosed herein, the one or more processors may include an inverse fast Fourier transform (IFFT) function for generating the one or more OFDM signals using the identified clock frequency and IFFT size pair.

In one implementation, the processor 610 can be a single-threaded processor. In another implementation, the processor 610 can be a multi-threaded processor. The processor 610 can be capable of processing instructions stored in the memory 620 or on the storage device 630.

As described above, the low pass filter may filter an output of the IFFT function to increase a sampling rate, by up-sampling with zeroes. For a range of IFFT sizes in an order of increasing size and an increasing value of A across the range, a number of multipliers for the low pass filtering for each of the IFFT sizes across the range increases at a slower rate than the value of A. Many embodiments are disclosed herein for the inclusion of a low pass filter, such as the example method of interpolation for increasing the sampling rate by up-sampling by zeroes followed by a Low-Pass Filter (LPF).

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to send communications to, and receive communications from one or more networks (e.g., subscriber network from content provider 105 of FIG. 1, network(s) 150 of FIG. 1, etc.). In implementations, the input/output device 640 can include driver devices configured to receive input data and send output data to other input/output devices, such as a gateway or router, as well as sending communications to, and receiving communications from a network 670, such as to and from a node or headend. Other implementations, however, can also be used, such as mobile computing devices, mobile communication devices, set-top box television client devices, etc.

In one or more examples, the functions disclosed herein may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors 610, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses. Various components, modules, or units are described in this disclosure to emphasize functional aspects of components configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

I claim:

1. A method for generating one or more Orthogonal Frequency Division Multiplexing (OFDM) signals, the method comprising:
   identifying a clock frequency and inverse fast Fourier transform (IFFT) size pair for generating the one or more OFDM signals, selecting the pair by:
      identifying a baseline IFFT size associated with a first sampling rate;
   selecting either a second IFFT size or a second sampling rate; and
      in response to selecting the second IFFT size, determining a clock frequency that pairs with the second IFFT size by modifying the first sampling rate by a factor of A, where A is the factor by which the selected second IFFT size differs from the baseline IFFT size, else
      in response to selecting the second sampling rate, using the second sampling rate for clock frequency paired with the baseline IFFT size modified by a factor of A, where A is the factor by which the selected second sampling rate differs from the first sampling rate; and
   generating the one or more OFDM signals using the identified clock frequency and IFFT size pair in an inverse Fast Fourier Transform (IFFT) function.

2. The method of claim 1, wherein the first sampling rate is 204.8 MHz.

3. The method of claim 2, wherein for the selected second IFFT size, the clock frequency that pairs with the selected second IFFT size is defined as Fs=204.8*A MHz, where A>1.

4. The method of claim 1, wherein the baseline IFFT size is at least one of 4096 or 8192 points.

5. The method of claim 3, wherein for the selected second sampling rate, modifying the baseline IFFT size by a factor of A results in an IFFT size paired with the selected second sampling rate that is equal to at least one of 4096*A or 8192*A.

6. The method of claim 1, wherein for a selected second IFFT size, a larger value of A results in a larger reduction of multipliers required for the IFFT function.

7. The method of claim 1, wherein the generation of one or more OFDM signals includes low pass filtering the output of the IFFT function to increase the sampling rate by up-sampling with zeroes.

8. The method of claim 7, wherein for a range of IFFT sizes in an order of increasing size, having an increasing value of A across the range, a number of multipliers for the low pass filtering for each of the IFFT sizes across the range increases at a slower rate than the value of A.

9. The method of claim 7, wherein the increased sampling rate=M*the first sampling rate, where M is a whole number and each IFFT output is up-sampled by M−1 zeroes during the up-sampling.

10. A device for generating one or more OFDM signals in an OFDM transmission system, the device comprising:
   a clock; and
   one or more processors for generating the one or more OFDM signals, wherein one or more processors are configured for:
      identifying a clock frequency for the clock and inverse fast Fourier transform (IFFT) size pair for generating the one or more OFDM signals, selecting the pair by:
         identifying a baseline IFFT size associated with a first sampling rate;
      selecting either a second IFFT size or a second sampling rate; and
         in response to selecting the second IFFT size, determining a clock frequency that pairs with the second IFFT size by modifying the first sampling rate by a factor of A, where A is the factor by which the selected second IFFT size differs from the baseline IFFT size, or else
         in response to selecting the second sampling rate, using the second sampling rate for clock frequency paired with the baseline IFFT size modified by a factor of A, where A is the factor by which the selected second sampling rate differs from the first sampling rate; and
      the one or more processors including an inverse fast Fourier transform (IFFT) function for generating the one or more OFDM signals using the identified clock frequency and IFFT size pair.

11. The device of claim 10, wherein the first sampling rate is 204.8 MHz.

12. The device of claim 11, wherein for the selected second IFFT size, the clock frequency that pairs with the selected second IFFT size is defined as Fs=204.8*A MHz, where A>1.

13. The device of claim 10, wherein the baseline IFFT size is at least one of 4096 or 8192 points.

14. The device of claim 13, wherein for the selected second sampling rate, modifying the baseline IFFT size by a factor of A results in an IFFT size paired with the selected second sampling rate that is equal to at least one of 4096*A or 8192*A.

15. The device of claim 10, wherein for a selected second IFFT size, a larger value of A results in a larger reduction of multipliers required for the IFFT function.

16. The device of claim 10, further comprising a low pass filter for filtering an output of the IFFT function, wherein the generation of one or more OFDM signals includes low pass filtering the output of the IFFT function to increase the sampling rate by up-sampling with zeroes.

17. The device of claim 16, wherein for a range of IFFT sizes in an order of increasing size, having an increasing value of A across the range, a number of multipliers for the low pass filtering for each of the IFFT sizes across the range increases at a slower rate than the value of A.

18. The device of claim 16, wherein the increased sampling rate=M*the first sampling rate, where M is a whole number and each IFFT output is up-sampled by M−1 zeroes during the up-sampling.

* * * * *